(12) United States Patent
Chang et al.

(10) Patent No.: US 10,769,109 B2
(45) Date of Patent: Sep. 8, 2020

(54) CONTROL METHOD FOR STORAGE DEVICE OF DRIVING RECORDER AND STORAGE DEVICE CONTROL SYSTEM

(71) Applicant: MStar Semiconductor, Inc., Hsinchu Hsien (TW)

(72) Inventors: Jen-Hao Chang, Hsinchu Hsien (TW); Chia-Jung Lee, Hsinchu Hsien (TW); Cheng-Chieh Yeh, Hsinchu Hsien (TW)

(73) Assignee: XIAMEN SIGMASTAR TECHNOLOGY LTD, Shamen, Fujian (CN)

( * ) Notice: Subject to any disclaimer, the term of this patent is extended or adjusted under 35 U.S.C. 154(b) by 358 days.

(21) Appl. No.: 15/709,813

(22) Filed: Sep. 20, 2017

(65) Prior Publication Data

US 2018/0373728 A1    Dec. 27, 2018

(30) Foreign Application Priority Data

Jun. 27, 2017   (TW) .............................. 106121373 A

(51) Int. Cl.
*G06F 7/00* (2006.01)
*G06F 16/17* (2019.01)
*G06F 3/06* (2006.01)
*G06F 16/13* (2019.01)

(52) U.S. Cl.
CPC ........ *G06F 16/1727* (2019.01); *G06F 3/0604* (2013.01); *G06F 3/0643* (2013.01); *G06F 3/0659* (2013.01); *G06F 3/0673* (2013.01); *G06F 16/13* (2019.01)

(58) Field of Classification Search
CPC .... G06F 16/1727; G06F 16/13; G06F 3/0643; G06F 3/0659; G06F 3/0673; G06F 3/0604
USPC ......................................... 707/822, 828, 812
See application file for complete search history.

(56) References Cited

U.S. PATENT DOCUMENTS

| | | | | | |
|---|---|---|---|---|---|
| 5,367,671 | A | * | 11/1994 | Feigenbaum | ........... G06F 16/10 |
| 5,461,483 | A | * | 10/1995 | Nakajima | ................. G06F 3/08 358/296 |
| 5,574,907 | A | * | 11/1996 | Jernigan, IV | ......... G06F 3/0601 |
| 5,581,311 | A | * | 12/1996 | Kuroiwa | ............... H04N 1/2112 348/231.2 |
| 5,661,800 | A | * | 8/1997 | Nakashima | ............. G06F 21/10 705/57 |
| 5,717,886 | A | * | 2/1998 | Miyauchi | .............. G06F 3/0601 707/999.001 |
| 6,247,126 | B1 | * | 6/2001 | Beelitz | ...................... G06F 8/63 713/1 |

(Continued)

FOREIGN PATENT DOCUMENTS

TW    200839773 A    10/2008

*Primary Examiner* — Mohammed R Uddin
(74) *Attorney, Agent, or Firm* — Edell, Shapiro & Finnan, LLC

(57) ABSTRACT

A control method for a storage device of a driving recorder includes: planning a directory entry of a storage device according to a predetermined directory entry stored in a storage unit; planning a file allocation table of the storage device according to a predetermined file allocation table stored in the storage unit; and controlling a controller to write data to the storage device according to the directory entry and the file allocation table.

14 Claims, 8 Drawing Sheets

(56) References Cited

U.S. PATENT DOCUMENTS

| | | | | |
|---|---|---|---|---|
| 6,604,170 B1* | 8/2003 | Suzuki | G06F 16/10 | 711/111 |
| 6,675,276 B2* | 1/2004 | Schulze | G06F 3/0604 | 711/200 |
| 7,856,452 B2* | 12/2010 | Itoh | G11B 20/10527 | 707/791 |
| 8,468,290 B2* | 6/2013 | Abe | G06F 3/0619 | 707/821 |
| 8,713,283 B2* | 4/2014 | Sinclair | G06F 3/0679 | 707/824 |
| 8,768,986 B2* | 7/2014 | Kishikawa | G06F 3/0619 | 707/829 |
| 2003/0093611 A1* | 5/2003 | Schulze | G06F 3/0604 | 711/103 |
| 2005/0050108 A1* | 3/2005 | Sawant | G06F 16/10 | |
| 2006/0020745 A1* | 1/2006 | Conley | G06F 3/061 | 711/103 |
| 2007/0162525 A1* | 7/2007 | Abe | G06F 16/162 | |
| 2008/0080323 A1* | 4/2008 | Katsuo | G11B 27/034 | 369/30.3 |
| 2008/0172426 A1* | 7/2008 | Patel | G06F 11/1435 | |
| 2009/0322905 A1* | 12/2009 | Matsuda | H04N 5/772 | 348/231.99 |
| 2011/0055297 A1* | 3/2011 | Maeda | G06F 3/0613 | 707/824 |
| 2011/0196904 A1* | 8/2011 | Kishikawa | G06F 3/0619 | 707/828 |
| 2012/0173595 A1* | 7/2012 | Salters | G06F 16/1865 | 707/822 |
| 2013/0036257 A1* | 2/2013 | Suda | G06F 12/0246 | 711/103 |
| 2013/0110889 A1* | 5/2013 | Shogome | G06F 16/16 | 707/823 |
| 2014/0279950 A1* | 9/2014 | Shapiro | G06F 16/164 | 707/692 |

* cited by examiner

US 10,769,109 B2

CONTROL METHOD FOR STORAGE DEVICE OF DRIVING RECORDER AND STORAGE DEVICE CONTROL SYSTEM

This application claims the benefit of Taiwan application Serial No. 106121373, filed Jun. 27, 2017, the subject matter of which is incorporated herein by reference.

BACKGROUND OF THE INVENTION

Field of the Invention

The invention relates in general to a control method and a control system, and more particularly to a control method for a storage device of a driving recorder and a storage device control system.

Description of the Related Art

A file system is a system for managing files in a storage device (e.g., an SD card or a hard drive) to efficiently conduct the storage device. A file allocation table (FAT) is a common file system.

FIG. 1 shows a schematic diagram of a storage device 900 adopting an FAT file system. The storage device 900 includes an FAT 920, a directory entry 930 and a plurality of data clusters 940. Taking a driving recorder for example, after multiple operations of writing and deleting files, data of the same file may be stored in a scattered manner in non-consecutive data clusters 940. For example, as shown in FIG. 1, a file FA is stored in data clusters numbered "13", "14", "15", "19" and "20".

The directory entry 930 records a file name and a starting data cluster number in the storage device 900. The FAT 920 records an FAT chain of the data clusters. For example, the directory entry 930 indicates that a file FA is stored in the storage device 900, and the data of the file FA is stored in the data cluster 940 numbered "13". In the FAT 920, the position corresponding to the data cluster 940 numbered "13" shows "14", which indicates that subsequent data of the file FA is stored in the data cluster 940 numbered "14". In the FAT 920, the position corresponding to the data cluster 940 numbered "14" shows "15", which indicates that subsequent data of the file FA is stored in the data cluster 940 numbered "15", and so forth. In the FAT 920, the position corresponding to the data cluster 940 numbered "20" shows "EOC", which indicates that the data cluster 940 numbered "20" is end of cluster-chain (EOC) of the data cluster 940.

FIG. 2 shows a flowchart of a method for writing a file of a driving recorder. FIG. 3 is a schematic diagram of a storage device 900 operating according to FIG. 2. For example, after a recording process of the driving recorder is activated, the FAT 920 in the storage device 900 is duplicated to a dynamic random access memory (DRAM) (step S901). It is then determined whether the storage space in the storage device 900 is sufficient according to the FAT in the DRAM (step S902). If the storage device 900 has a sufficient storage space, one data cluster is selected as a starting data cluster for writing data therein (e.g., the data cluster numbered "16") (step S903), and a file name (e.g., FB) and the number of a starting data cluster (e.g., "16") are added into the FAT 930. Then, another data cluster is selected for writing data therein (e.g., the data cluster numbered "17") (step S905), the number of the data cluster (e.g., "17") is recorded in the FAT in the DRAM, at a position corresponding to the data cluster numbered "16" (step S906), and the data is written to the data cluster (step S907). The above steps are repeated until the writing process of the file is completed. Further, when the FAT in the DRAM is updated for a predetermined number of times (e.g., three times), the FAT 920 in the storage device 900 is updated according to the FAT in the DRAM until the writing process of the file ends. After the writing process of the file ends, the driving recorder again updates the FAT 920 in the storage device 900 according to the FAT in the DRAM.

However, unexpected power disconnections caused by car accidents may result in a reading failure due to an incomplete FAT chain. For example, as shown in FIG. 3, in the event of an unexpected power disconnection after the data of the file FB is written to the data cluster numbered "29", the FAT chain of the data FB is incomplete because the FAT 920 in the storage device 900 is not yet updated according to the FAT in the DRAM, in a way that the data of the file FB stored at the data clusters numbered "22" and "29" cannot be read. With respect to a driving recorder, the failure in reading data related to a car accident is an extremely severe problem.

SUMMARY OF THE INVENTION

The invention is directed to a control method for a storage device of a driving recorder and a storage device control system, which plan a storage device according to a predetermined file allocation table (FAT) and a predetermined directory entry to prevent reading failures caused by unexpected power disconnections.

According to an aspect of the present invention, a control method for a storage device of a driving recorder is provided. The control method for a storage device of a driving recorder includes steps of: planning a directory entry of a storage device according to a predetermined directory entry stored in a storage unit; planning a file allocation table (FAT) of the storage device according to a predetermined FAT stored in the storage unit; and controlling a controller to write data to the storage device according to the directory entry and the FAT.

According to another aspect of the present invention, a storage device control system is provided. The storage device control system includes a storage unit, a controller and a processor. The storage unit stores a predetermined directory entry and a predetermined FAT. The controller writes data to a storage device. The processor performs steps of: planning a directory entry of the storage device according to the predetermined directory file; planning an FAT of the storage device according to the predetermined FAT; and controlling the controller to write data to the storage device according to the directory file and the FAT.

The above and other aspects of the invention will become better understood with regard to the following detailed description of the non-limiting embodiments. The following description is made with reference to the accompanying drawings.

DETAILED DESCRIPTION OF THE INVENTION

In view of issues of a storage device of a driving recorder of the prior art, the present invention provides a control method for a storage device of a driving recorder and a storage device control system, which plan a file allocation table (FAT) and a directory entry of a storage device according to a predetermined FAT and a predetermined directory entry to prevent reading failures caused by an unexpected power disconnection.

Figure 1:
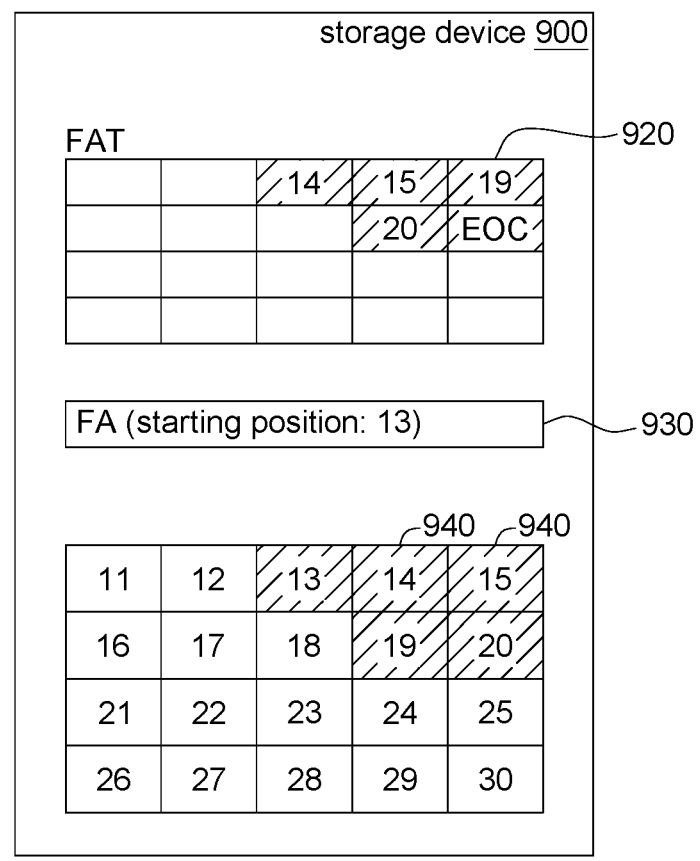
FIG. 1 (prior art) is a schematic diagram of a storage device adopting an FAT file system of the prior art.
Figure 2:
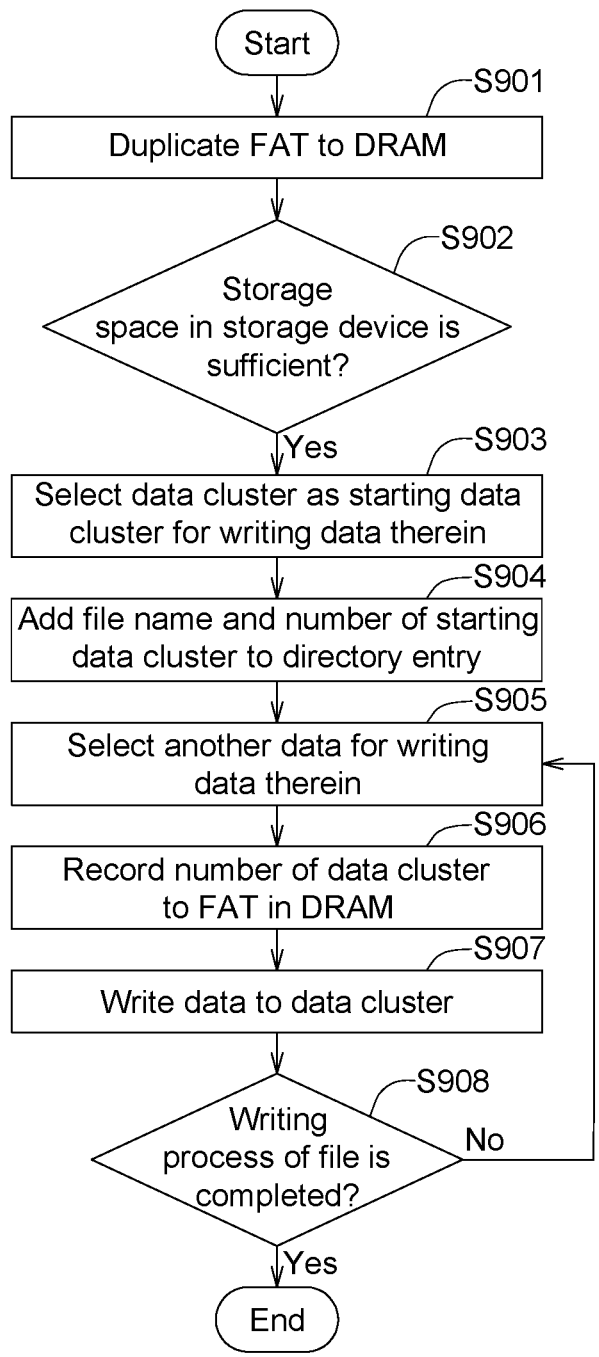
FIG. 2 (prior art) is a flowchart of a method for writing a file of a driving recorder of the prior art.
Figure 3:
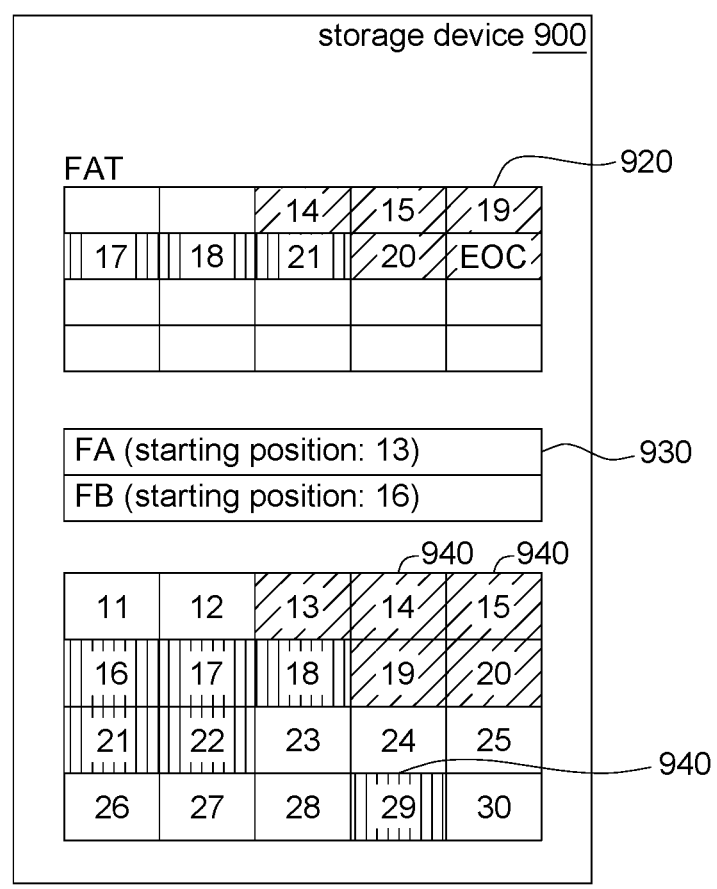
FIG. 3 (prior art) is a schematic diagram of a storage device performing the operation in FIG. 2.
Figure 4:
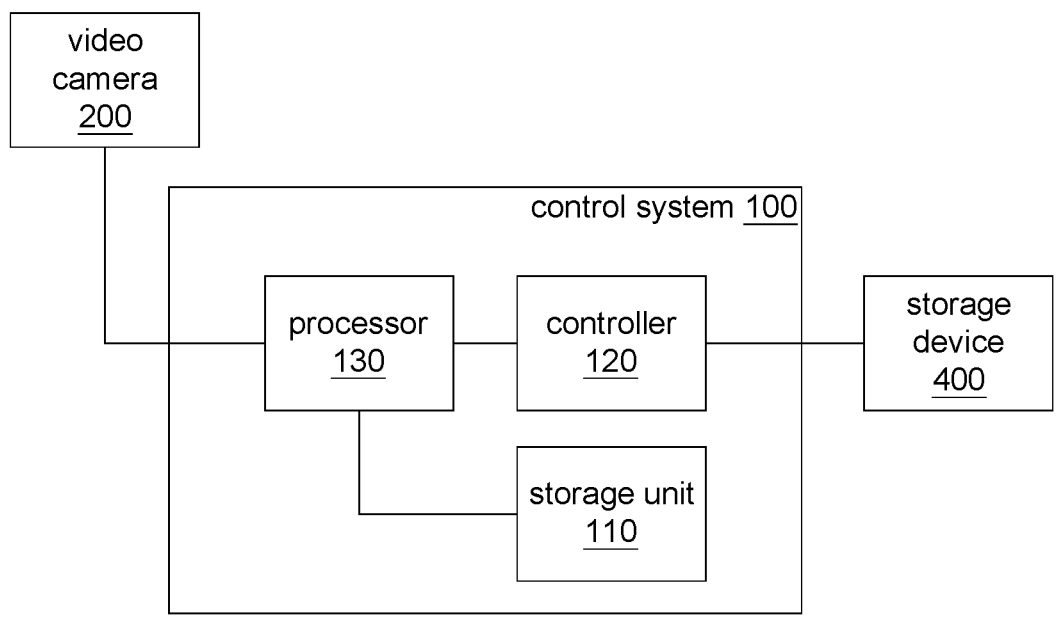
FIG. 4 is a block diagram of a control system according to an embodiment of the present invention.

FIG. 4 shows a block diagram of a control system 100 according to an embodiment of the present invention. For example, the control system 100 is a control chip. In this embodiment, the control system 100 is connected to a video camera 200 and a storage device 400. The control system 100 and the video camera 200 may be provided at a driving recorder, for example. The storage device 400 is, for example, an SD card or a hard drive, and may be built in or externally connected to the driving recorder. The control system 100 includes a storage unit 110, a controller 120 and a processor 130. The storage unit 110 stores a predetermined directory entry and a predetermined FAT. The controller 120 writes data to the storage device 400. The processor 130 plans a directory entry and an FAT of the storage device 400.

Figure 5:
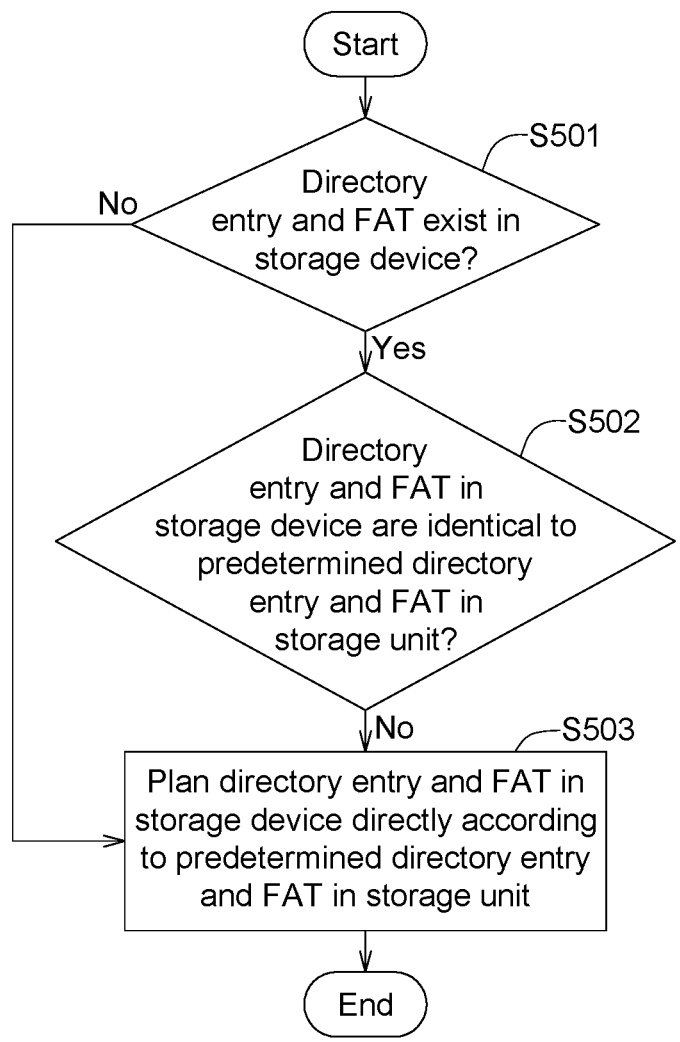
FIG. 5 is a flowchart of a control method for a storage device of a driving recorder according to an embodiment of the present invention.

FIG. 5 shows a flowchart of a control method for a storage device of a driving recorder according to an embodiment of the present invention. In this embodiment, each time the driving recorder is activated, or each time the storage device 400 is replaced, the processor 130 checks whether a directory entry or an FAT exists in the storage device 400 (step S501). If not, the processor 130 directly plans the directory entry and the FAT in the storage device 400 according to the predetermined directory entry and the predetermined FAT in the storage unit 110 (step S503); if so, the processor 130 further checks whether the directory entry and the FAT in the storage device 400 are identical to the predetermined directory entry and the predetermined FAT in the storage unit 110 (step S502). If different, the processor 130 directly plans the directory entry and the FAT in the storage device 400 according to the predetermined directory entry and the predetermined FAT in the storage unit 110 (step S503).

Figure 6:
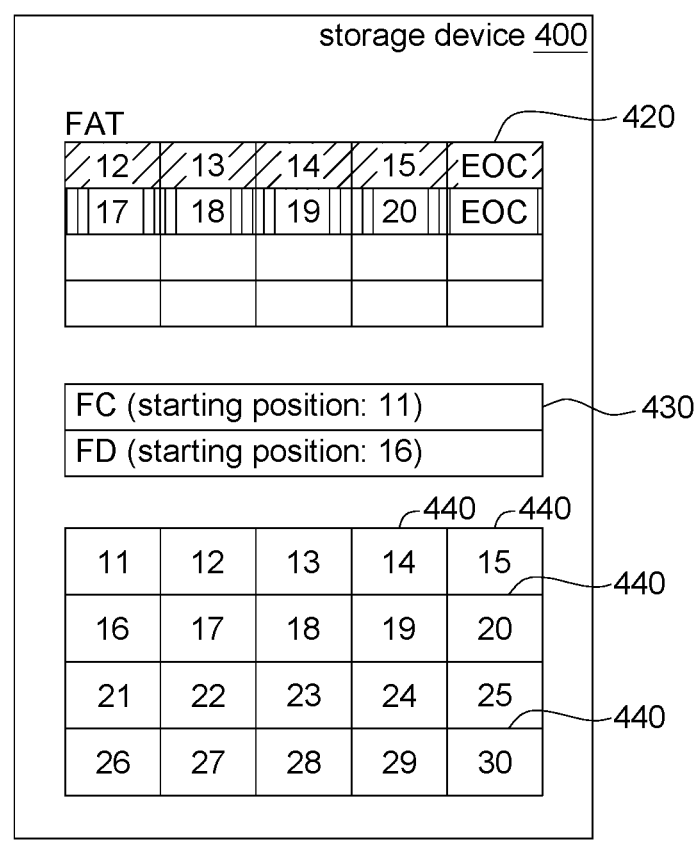
FIG. 6 is a schematic diagram of a storage device in which a directory file and a file allocation table (FAT) are planned according to an embodiment of the present invention.

FIG. 6 shows a schematic diagram of a storage device 400 in which a directory entry and an FAT are planned according to an embodiment of the present invention. The storage device 400 includes an FAT 420 planned according to a predetermined FAT, a directory entry 430 planned according to a predetermined FAT, and a plurality of data clusters 440.

As shown in FIG. 6, in the directory entry 430, the processor 130 plans a file name FC corresponding to a file and a starting data cluster corresponding to the file FC as a data cluster numbered "11"; and in the FAT 420, the processor 130 further plans the FAT chain corresponding to the file FC as the data clusters numbered "11" to "15". Similarly, in the directory entry 430, the processor 130 plans a corresponding file name FD and a starting data cluster corresponding to the file FD as a data cluster numbered "16"; and in the FAT 420, the processor 130 further plans the FAT chain corresponding to the file FD as the data clusters numbered "16" to "20".

In other words, the data of the file FC is preset to be stored in the data clusters numbered "11" to "15", and the data of the file FD is preset to be stored in the data clusters numbered "16" to "20". It should be noted that, although the directory entry 430 and the FAT 420 are already planned, in the storage device 400, the data clusters corresponding to the file FC and the file FD (i.e., the data clusters numbered "11" to "20") are not stored with the data corresponding to the file FC and the file FD, as shown in FIG. 6.

Figure 7:
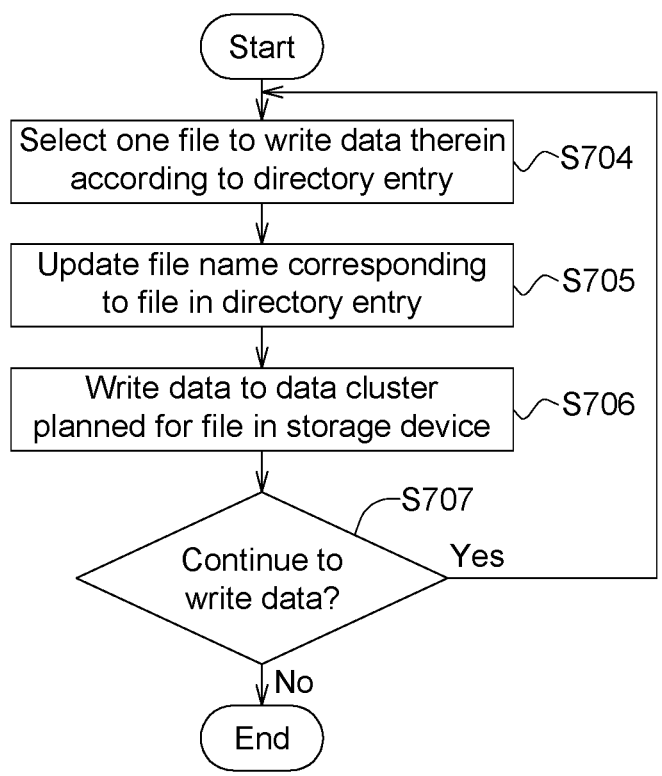
FIG. 7 is a flowchart of writing data to a storage device according to an embodiment of the present invention.

FIG. 7 shows a flowchart of writing data to the storage device 400 according to an embodiment of the present invention. In this embodiment, the processor 130 controls the controller 120 to write data to the storage device 400 according to the directory entry 430 and the FAT 420.

For example, as the driving recorder starts recording, the processor 130 selects a file for writing data therein according to the directory entry 430 (step S704). In one embodiment, the file names in the directory entry 430 carry time information, and so the processor 130 can select an oldest file for writing data therein according to the file names in the directory entry 430. Taking FIG. 6 for example, the file FC is the oldest file.

Figure 8:
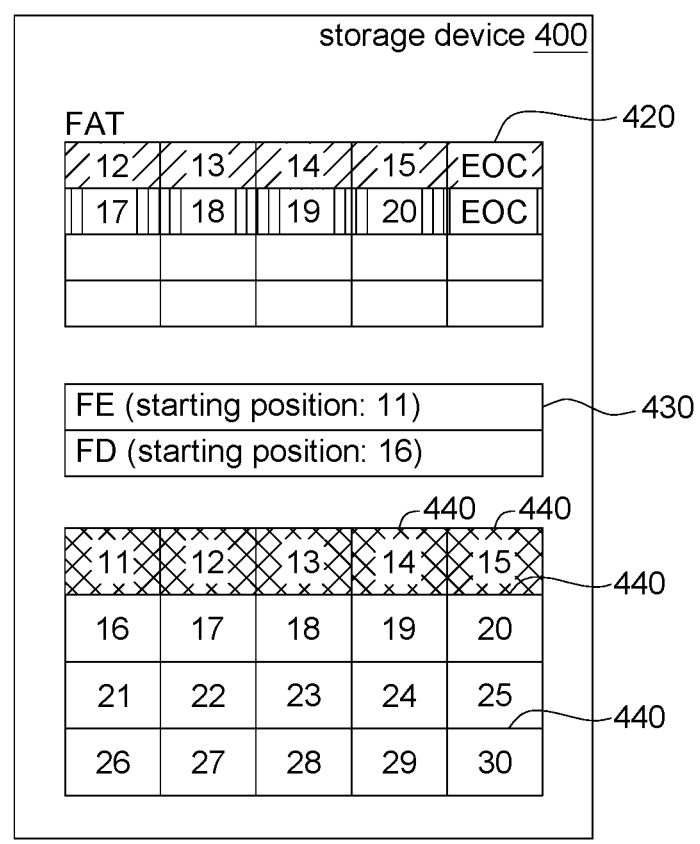
FIG. 8 is a schematic diagram of a storage device performing the operation in FIG. 7.

Next, the processor 130 changes the file name in the directory entry 430 corresponding to the file (step S705). In continuation of the above example, the processor 130 changes, in the directory entry 430, the file name of the file that the processor 130 selects for writing data therein from "FC" to "FE", as shown in FIG. 8. It should be noted that, in the directory entry 430, the starting data cluster corresponding to the file FE stays unchanged and is still the data cluster numbered "11". Further, in the FAT 420, the FAT chain corresponding to the file FE remains unchanged, and is still the data clusters numbered "11" to "15".

The processor 130 controls the controller 120 to write data to the data clusters in the storage device 400 planned for the file (step S706). In continuation of the above example, the processor 130 controls the controller 120 to write data sequentially to the data clusters numbered "11" to "15" in the storage device 400, as shown in FIG. 8.

Next, the processor 130 determines whether to continue writing data (step S707). If data is continued to be written, steps S704 to S706 are repeated; if not, the process ends.

It is known from the above that, during the process in which the processor 130 writes data to the storage device 400, the FAT 420 is not updated. Thus, even if the driving recorder encounters an unexpected power disconnection, the FAT chain corresponding to a file in the FAT is kept intact, and the data in the file in the storage device 400 can still be completely read.

Further, in the prior art, a processor needs to spend time on searching for empty data clusters for writing data therein. After multiple operations of writing and deleting a file, empty data clusters are usually in fragments, and so file writing performance is reduced. Compared to the prior art, the data clusters of files in the present invention are pre-planned and do not change, meaning that the processor need not spend time on searching for empty clusters for writing data therein, thereby enhancing the file writing performance. In one embodiment, the clusters of files may be planned as being consecutive (as shown in FIG. 6) to further enhance the file writing performance.

Further, in the prior art, a processor needs to determine whether an available space is sufficient before writing data.

If the available space is insufficient, the processor needs to delete the file name and a starting data cluster corresponding to at least one file from the directory entry, and also delete the FAT chain corresponding to the least one file from the FAT, reducing the file writing performance. Compared to the prior art, the processor 130 of the present invention is not required to determine whether an available space is sufficient before writing data, nor is the processor required to delete the file name and the starting data cluster from the directory file and the FAT chain from the FAT, thereby further enhancing the file writing performance.

While the invention has been described by way of example and in terms of the above embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method for a storage device of a driving recorder, comprising:
    planning a directory entry of the storage device according to a predetermined directory entry stored in a storage unit;
    planning a file allocation table (FAT) of the storage device according to a predetermined FAT stored in the storage unit; and
    controlling a controller to write data to the storage device according to the directory entry and the FAT,
    wherein entries in the FAT correspond to respective predetermined clusters in the storage device and wherein each entry in the FAT remains unchanged after new data is written to the respective predetermined clusters in the storage device.

2. The control method according to claim 1, wherein the step of planning the directory entry of the storage device comprises:
    planning in the directory entry a file name corresponding to a file.

3. The control method according to claim 2, wherein the step of planning the directory entry of the storage device comprises:
    planning in the directory entry a starting data cluster corresponding to the file.

4. The control method according to claim 3, wherein the step of planning the FAT of the storage device comprises:
    planning in the FAT a FAT chain corresponding to the file.

5. The control method according to claim 4, wherein the step of controlling the controller to write data to the storage device according to the directory entry and the FAT comprises:
    updating in the file directory the file name corresponding to the file; and
    controlling the controller to write data to the data cluster in the storage device planned for the file.

6. The control method according to claim 5, wherein in the directory entry the starting data cluster corresponding to the file stays unchanged.

7. The control method according to claim 6, wherein in the FAT the FAT chain corresponding to the file stays unchanged.

8. A storage device control system, comprising:
    a storage unit, storing a predetermined directory entry and a predetermined file allocation table (FAT);
    a controller, writing data to a storage device; and
    a processor, performing steps of:
    planning a directory entry of the storage device according to the predetermined directory entry;
    planning an FAT of the storage device according to the predetermined FAT; and
    controlling the controller to write data to the storage device according to the directory entry and the FAT,
    wherein entries in the FAT correspond to respective predetermined clusters in the storage device and wherein each entry in the FAT remains unchanged after new data is written to the respective predetermined clusters in the storage device.

9. The storage device control system according to claim 8, wherein the step of planning the directory entry of the storage device comprises:
    planning in the directory entry a file name corresponding to a file.

10. The storage device control system according to claim 9, wherein the step of planning the directory entry of the storage device comprises:
    planning in the directory entry a starting data cluster corresponding to the file.

11. The storage device control system according to claim 10, wherein the step of planning the FAT of the storage device comprises:
    planning in the FAT a FAT chain corresponding to the file.

12. The storage device control system according to claim 11, wherein the step of controlling the controller to write data to the storage device according to the directory entry and the FAT comprises:
    changing in the directory entry the file name corresponding to the file; and
    controlling the controller to write data to the data cluster in the storage device planned for the file.

13. The storage device control system according to claim 12, wherein in the directory entry the starting data cluster corresponding to the file stays unchanged.

14. The storage device control system according to claim 13, wherein in the FAT the FAT chain corresponding to the file stays unchanged.

* * * * *